(12) United States Patent
Moriya (10) Patent No.: US 7,714,944 B2
(45) Date of Patent: *May 11, 2010

(54) PROJECTION SYSTEM

(75) Inventor: Norihisa Moriya, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 910 days.

This patent is subject to a terminal disclaimer.

(21) Appl. No.: 11/281,285

(22) Filed: Nov. 17, 2005

(65) Prior Publication Data

US 2006/0103769 A1   May 18, 2006

(30) Foreign Application Priority Data

Nov. 18, 2004  (JP)  ............................. 2004-334509

(51) Int. Cl.
*G02F 1/1335* (2006.01)

(52) U.S. Cl. ............................. 349/5; 359/449; 353/20; 362/19; 349/9

(58) Field of Classification Search ....................... None
See application file for complete search history.

(56) References Cited

U.S. PATENT DOCUMENTS

| | | | |
|---|---|---|---|
| 6,005,644 A * | 12/1999 | Aruga et al. ................... | 349/5 |
| 6,381,068 B1 | 4/2002 | Harada et al. | |
| 7,019,900 B2 | 3/2006 | Benning et al. | |
| 7,158,299 B2 | 1/2007 | Umeya | |
| 7,213,930 B2 | 5/2007 | Quach | |
| 7,234,817 B2 | 6/2007 | Paukshto | |
| 2006/0181769 A1 | 8/2006 | Kumasawa et al. | |

2007/0052638 A1  3/2007  May et al.

FOREIGN PATENT DOCUMENTS

| | | |
|---|---|---|
| JP | 5-107660 | 4/1993 |
| JP | 2002-540445 | 11/2002 |

OTHER PUBLICATIONS

USPTO Office Action mailed Apr. 7, 2008 for co-pending U.S. Appl. No. 11/281,010.
USPTO Office Action mailed Dec. 12, 2008 for co-pending U.S. Appl. No. 11/281,010.
USPTO Final Office Action mailed Jul. 8, 2009 for co-pending U.S. Appl. No. 11/281,010.

* cited by examiner

*Primary Examiner*—David Nelms
*Assistant Examiner*—Lucy P Chien
(74) *Attorney, Agent, or Firm*—Ladas & Parry LLP (57) ABSTRACT

The main object of the present invention is to present a projection system excellent in visibility from inside of projection system to outside, and capable of obtaining a sharp contrast display without being influenced by the ambient light.

The present invention provides a projection system comprising: a projection screen, containing a substrate and a polarized light selective-reflection layer formed on the substrate and diffuse-reflects right-handed circularly polarized light or left-handed circularly polarized light, which displays an image by reflecting an image light irradiated from a projector; a projector for projecting an image light on the projection screen; and an external light screen installed at an external light entrance, disposed in a sequence of a linearly polarizing plate and a retardation plate from an external side, and circularly polarizes a light in reverse direction to the circularly polarized light diffuse-reflected by the polarized light-selective reflection layer, wherein a transmission axis of the linearly polarizing plate is in vertical direction.

8 Claims, 3 Drawing Sheets

PROJECTION SYSTEM

BACKGROUND OF THE PRESENT INVENTION

1. Field of the Present Invention

The present invention relates to a projection system comprising a projection screen, a projector, and an external light screen.

2. Description of the Related Art

A conventional projection system is generally designed to display an incident image light, from a projector, on a projection screen, and an observer observes its reflected light as an image.

Recently, along with downsizing, price-reduction, etc. of the projector main body, demand for use at home, such as home theater system, is increasing, and the projection systems are widely used in general household. In such projection system, image contrast of an image is brought forth by intensity difference of the incident light (image light), from the projector, incident on the projection screen. For example, when displaying a white picture on a black background, the portion of the projection screen lighten by the incident light will be white and the other portion will be black, thereby the image contrast is brought forth by such difference in brightness between black and white. Therefore, to realize a favorable image display, it is required to emphasize the contrast difference by making the white display portion brighter and the black display portion darker.

However, when such projection system is used at home, for example, it is often placed in a living room, and such place is usually designed to get ambient light such as external light. Accordingly, the projection system reflects ambient light, such as external light, as well as the image light, and both white display portion and black display portion become brighter so that the difference of brightness between black and white becomes smaller. As a result, in such conventional projection screen, it is difficult to realize a favorable image display unless influence by the ambient light such as external light is suppressed by using a means to darken the room or other environmental means.

To solve such problem, it has been studied to develop a projection screen capable of realizing favorable image display even in the presence of high levels of ambient light. For example, those using hologram are proposed. The projection screen using hologram has advantages that it can make the white display portion brighter by controlling the scattering effect, it realizes a relatively favorable image display in presence of high levels of ambient light, and it has wavelength selectivity. However, it does not have polarized light selectivity, and there is a problem that it can only display an image with sharpness of limited degree. Further, there is a problem that, in the projection screen using hologram, it is difficult to obtain a wide screen because of manufacturing problem.

On the other hand, as a projection screen capable of realizing favorable image display even in the presence of high levels of ambient light, a projection screen using a polarized light selective-separation layer is proposed (see Japanese Patent Application Laid-Open Nos. 5-107660 and 2002-540445). The projection screen using polarized light selective-separation layer is capable of making the black display portion darker while keeping the white display portion bright, and as compared with ones using hologram, a sharp image can be displayed in the presence of high levels of ambient light. Specifically, a cholesteric liquid crystal, which reflects right-handed circularly polarized light or left-handed circularly polarized light contained in image light, can be listed. For example, when a cholesteric liquid crystal, which reflects right-handed circularly polarized light, is used, the left-handed circularly polarized light is not reflected by the circularly polarized light separation function of the cholesteric liquid crystal, and influence of the ambient light can be reduced.

However, when using, for example, a cholesteric liquid crystal for reflecting right-handed circularly polarized light, since the right-handed circularly polarized light of environmental light is reflected, sufficient improvement of the contrast cannot be realized in some cases.

Supposing a light source in natural field, almost all of the light derives from the sunlight, and as the ambient light proceeding into the projection system from the external light entrance, there are direct light from the sun and reflected light of which the direct light is reflected by some object. Usually, the direct light from the sun can be separated into, to the proceeding direction, P waves (longitudinal waves) and S waves (transversal waves). Considering reflection of the light On a dielectric interface, while reflection is within Brewster's angle, S waves are totally reflected, and hence the reflected light usually contains a lot of S wave components. Specifically, if the outer field is wet by rain, etc., a lot of S wave component is contained in the reflected light, due to the total reflection at air-water interface. When such reflected light containing much S wave components is seen from inside of the projection system, so-called glare occurs, and visibility is not satisfactory.

SUMMARY OF THE PRESENT INVENTION

The invention is devised in the light of the above background. The main object of the present invention is to present a projection system excellent in visibility from inside of projection system to outside, and capable of obtaining a sharp contrast display without being influenced by the ambient light.

The present invention provides a projection system comprising: a projection screen, containing a substrate and a polarized light selective-reflection layer formed on the substrate and diffuse-reflects right-handed circularly polarized light or left-handed circularly polarized light, which displays an image by reflecting an image light irradiated from a projector; a projector for projecting an image light on the projection screen; and an external light screen installed at an external light entrance, disposed in a sequence of a linearly polarizing plate and a retardation plate from an external side, and circularly polarizes a light in reverse direction to the circularly polarized light diffuse-reflected by the polarized light-selective reflection layer, wherein a transmission axis of the linearly polarizing plate is in vertical direction.

Further in the invention, since the transmission axis of the linearly polarizing plate is in vertical direction, only the light vibrating in the vertical direction can be transmitted, and S wave component caused by total reflection at the dielectric interface can be canceled to obtain anti-glare effect and to improve visibility from inside of projection system to outside. Further in the invention, the polarized light selective reflection layer has a property of diffusing and reflecting right-handed circularly polarized light or left-handed circularly polarized light, and the external light screen composes a circularly polarized light in reverse direction of circularly polarized light diffused and reflected by the polarized light selective reflection layer. Therefore, reflection of external light on projection screen can be theoretically set to zero, and only image light is reflected to obtain display of sharp contrast. Moreover, in the invention, since P wave components of light from outer field can be taken into the projection system, a bright state can be maintained.

Preferably, in the present invention, the polarized light selective-reflection layer has a cholesteric liquid crystal structure. The cholesteric liquid crystal structure has a spiral structure, as physical molecular arrangement of liquid crystal molecules, in which directors of the liquid crystal molecules rotate continuously in the thickness direction of the layer. On the basis of such physical molecular arrangement of the liquid crystal molecules, for example, polarized light separating property, which separates the circularly polarized light in one direction from the circularly polarized light in reverse direction, can be exhibited.

Preferably, in the present invention, the external light screen is a wide-band type circularly polarizing plate which circularly polarizes a light in visible light region. Since external light usually includes wavelength components of the entire visible light region, influence of the external light can be theoretically set to zero in the present invention by circularly polarizing light in the entire visible light region.

The present invention also provides an external light screen used in the above-described projection system.

According to the invention, by using the external light screen, a desired circularly polarized light can be obtained. Since the transmission axis of the linearly polarizing plate is in vertical direction, anti-glare effect is obtained, and visibility from inside of projection system to outside is improved.

In the invention, since the transmission axis of the linearly polarizing plate is in vertical direction, S wave component caused by total reflection at the dielectric interface can be canceled to obtain anti-glare effect, and to improve visibility from inside of projection system to outside. Further in the inventions since the circularly polarized light diffused and reflected by the polarized light selective reflection layer, and the circularly polarized light composed by the external screen are in mutually reverse directions, reflection of external light on projection screen can be theoretically set to zero to reflect only image light, so that display of sharp contrast is obtained. Moreover, in the invention, since P wave components of light from outer field can be taken into the projection system, a bright state can be maintained.

DESCRIPTION OF THE PREFERRED EMBODIMENT

Projection system and external screen of the present invention are described below.

A. Projection System

The projection system of the present invention comprises: a projection screen, containing a substrate and a polarized light selective-reflection layer formed on the substrate and diffuse-reflects right-handed circularly polarized light or left-handed circularly polarized light, which displays an image by reflecting an image light irradiated from a projector; a projector for projecting an image light on the projection screen; and an external light screen installed at an external light entrance, disposed in a sequence of a linearly polarizing plate and a retardation plate from an external side, and circularly polarizes a light in reverse direction to the circularly polarized light diffuse-reflected by the polarized light-selective reflection layer, wherein a transmission axis of the linearly polarizing plate is in vertical direction.

Further in the invention, since the transmission axis of the linearly polarizing plate is in vertical direction, only the light vibrating in the vertical direction can be transmitted, and S wave component caused by total reflection at the dielectric interface can be canceled to obtain anti-glare effect, and to improve visibility from inside of projection system to outside. Further in the invention, the polarized light selective reflection layer has a property of diffusing and reflecting right-handed circularly polarized light or left-handed circularly polarized light, and the external light screen composes a circularly polarized light in reverse direction of circularly polarized light diffused and reflected by the polarized light selective reflection layer. Therefore, reflection of external light on projection screen can be theoretically set to zero, and only image light is reflected to obtain display of sharp contrast. Moreover, in the invention, since P wave components of light from outer field can be taken into the projection system, a bright state can be maintained.

Figure 1:
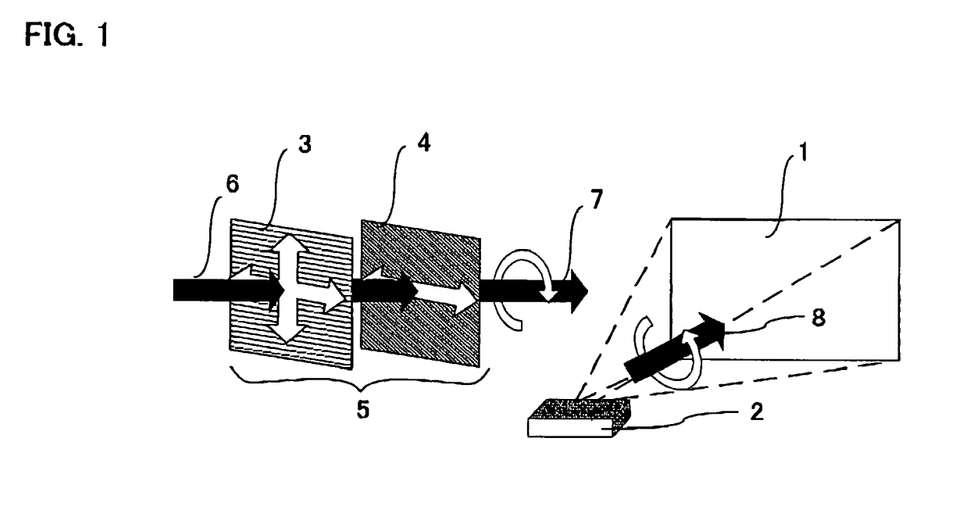
FIG. 1 is an illustration showing an example of the projection system of the present invention.

The projection system of the present invention is described below by referring to the drawing. For example, as shown in FIG. 1, the projection system of the present invention comprises: a projection screen 1 containing a substrate and a polarized light selective-reflection layer formed on the substrate; a projector 2 for projecting an image light on the projection screen 1; and an external light screen 5 installed at an external light entrance and disposed in a sequence of a linearly polarizing plate 3 and a retardation plate 4 from an external side. In the invention, since the transmission axis of the linearly polarizing plate 3 is in vertical direction, S wave component of external light 6 does not transmit, and anti-glare effect is obtained. Besides, P ware component transmitting the linearly polarizing plate 3 transmits through the retardation plate 4 to become right-handed circularly polarized light 7. Since the right-handed circularly polarized light 7 is not reflected by the projection screen 1 which diffuses and reflects left-handed circularly polarized light 8, display of sharp contrast is obtained.

As used herein, diffuse-reflection by the polarized light selective-reflection layer means expansion and scattering of the reflected light (image light), reflected by the projection screen, to such an extent as to be recognized as an image by the observer.

Components of such projection system of the present invention are individually described below. First, the external light screen, the most peculiar element of the present invention, is explained, and then the projection screen and projector are explained.

1. External Light Screen

First, the external light screen used in the projection system of the present invention is explained. The external light screen used in the present invention is disposed in the sequence of the linearly polarizing plate and retardation plate from the external side, and this external light screen circularly polarizes the light in reverse direction to the circularly polarized light diffuse-reflected by the polarized light selective-reflection layer, wherein the linearly polarizing plate is in vertical direction.

In the external light screen used in the invention, since the transmission axis of the linearly polarizing plate is in vertical direction, only the light vibrating in the vertical direction can be transmitted, and S wave component caused by total reflection at the dielectric interface can be canceled to obtain anti-glare effect, and to improve visibility from inside of projection system to outside. Further the external light screen used in the invention composes a circularly polarized light in reverse direction of circularly polarized light diffused and reflected by the polarized light selective reflection layer described below. Therefore, reflection of external light on projection screen can be theoretically set to zero, and only image light is reflected to obtain display of sharp contrast. Moreover, since the external light screen takes in P wave components of light from outer field into the projection system, a bright state can be maintained.

(1) Linearly Polarizing Plate

The linearly polarizing plate used in the present invention is described. The linearly polarizing plate used in the present invention is used for obtaining a linearly polarized light, in vertical direction, from external light.

In the invention, by using the linearly polarizing plate, only the light vibrating in the vertical direction can be transmitted, and S wave component of external light can be canceled to obtain anti-glare effect, and to improve visibility from inside of projection system to outside. Further, by transmitting the obtained linearly polarized light through the retardation plate described below, a desired circularly polarized light can be obtained.

The linearly polarizing plate used in the present invention is not particularly limited as long as a linearly polarized light in vertical direction can be obtained. So-called iodine based polarizing plates can be listed for example, which are fabricated by dispersing iodine dye in polyvinyl alcohol, aligning iodine molecules in a specified direction by drawing process, and enclosing thereof with triacetyl cellulose layers as protective layers. Commercial iodine based polarizing plates include, for example, G1220DUN manufactured by Nitto Denko and LLC2-9118 manufactured by Sanritz Co., and both can be preferably used in the present invention.

(2) Retardation Plate

Next the retardation plate used in the present invention is described. The retardation plate used in the present invention converts the linearly polarized light, obtained from the above-described linearly polarizing plate, into the circularly polarized light. And the retardation plate is used to obtain the circularly polarized light in reverse direction to the circularly polarized light diffuse-reflected by the polarized light selective-reflection layer.

In the present invention, by using the retardation plate, a desired circularly polarized light can be obtained. Being in reverse direction to the circularly polarized light diffuse-reflected by the polarized light selective-reflection layer described below, reflection of external light on the projection screen can be theoretically set to zero, and only the image light is reflected, so that a display of sharp contrast can be obtained.

The retardation plate used in the present invention is not particularly limited as long as the linearly polarized light obtained from the above-described linearly polarizing plate can be converted into a desired circularly polarized light, and it is preferably a wide-band type retardation plate which circularly polarizes the light in visible light region. Since the external light usually contains wavelength components across the entire visible light region, by circularly polarizing the light across the entire visible light region, influence by the external light can be theoretically set to zero in the present invention. For example, only the light in a certain visible light region, specifically only the highest visibility green color (around 550 nm), can be circularly polarized. However, when a retardation plate, which cannot circularly polarize the light in the other visible light region completely, is used, a part of the light is reflected on the projection screen so that the image contrast will be deteriorated.

To obtain a circularly polarized light, a combination of a $\lambda/4$ retardation plate and a linearly polarizing plate is usually used. To make it a wider-band type, the following can be used: a laminated type $\lambda/4$ retardation plate, wherein so-called a general $\lambda/2$ retardation plate of a wavelength-dispersive type and a $\lambda/4$ retardation plate are stuck together at a certain angle, that functions as a wide-band type retardation plate making the refractive index anisotropy larger on the short wavelength side; and a $\lambda/4$ retardation plate of so-called reverse wavelength dispersive type which makes the refractive index anisotropy smaller on the short wavelength side. Above all, a retardation film of the reverse wavelength dispersive type is preferably used because it is low in angle dependency to the circularly polarized degree of the light. As such retardation film of the reverse wavelength dispersive type, Pure Ace WR-W (Trade name: manufactured by Teijin Ltd.) can be used.

(3) External Light Screen

The external light screen used in the present invention is not particularly limited as long as it is an external screen of which a desired circularly polarized light can be obtained. Specifically, it is preferable to use the linearly polarizing plate mentioned above, in combination with $\lambda/4$ retardation plate as the retardation plate. Particularly, it is preferable that the external light screen is the wide-band type circularly polarizing plate, by using the wide-band type $\lambda/4$ retardation plate as the retardation plate. Since the external light usually contains the wavelength components across the entire visible light region, by circularly polarizing the light of the entire visible light region, influence of the external light can be theoretically set to zero in the present invention.

In the case of the above combination, the linearly polarizing plate and $\lambda/4$ retardation plate are disposed in this sequence from the external side, and the angle of the linearly polarizing plate to the $\lambda/4$ retardation plate is determined so as the light is circularly polarized desirably. At this time, whether to obtain right-handed or left-handed circularly polarized light is determined by the direction of the circularly polarized light diffuse-reflected by the projection screen. Both the circularly polarized light of right-handed and left-handed can be obtained by adjusting the angle of $\lambda/4$ retardation plate. Incidentally, the circularly polarized light does not have anisotropy in the light vibrating direction, and whether desired circularly polarized light or not is determined by relative angle of linearly polarizing plate and $\lambda/4$ retardation plate. Therefore, the direction of the transmission axis of the linearly polarizing plate is not particularly limited. However, in the invention, in order to cancel S waves, it is required to determine the transmission axis of the linearly polarizing plate in vertical direction.

The using method of the external light screen used in the present invention is not particularly limited. For example, by providing an adhesive layer on the surface of the linearly polarizing plate, the external light screen may be directly adhered to the external light entrance such as window, or it may be installed near the external light entrance such as window, as a blind.

2. Projection Screen

Figure 2:
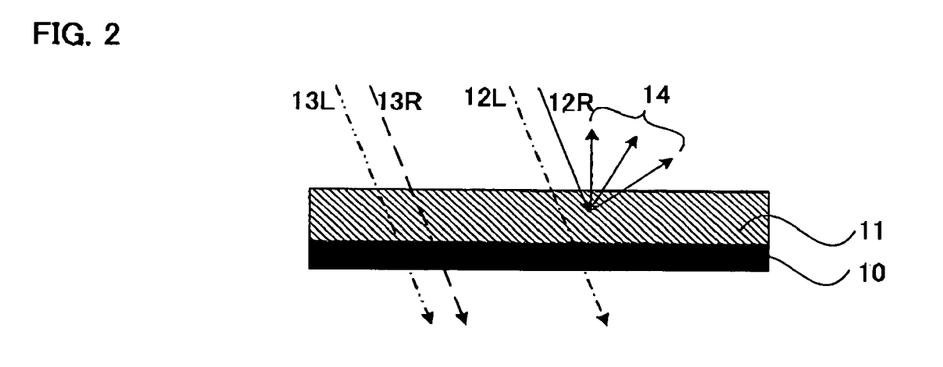
FIG. 2 is an illustration explaining the optical function of the polarized light selective-reflection layer of the present invention.

Next, the projection screen used in the projection system of the present invention is explained. The projection screen used in the present invention contains at least a substrate, and a polarized light selective-reflection layer formed on the substrate, which diffuse-reflects right-handed circularly polarized light or left-handed circularly polarized light, and is designed to display an image by reflecting the image light irradiated from the projector. The projection screen used in the present invention has, for example as shown in FIG. 2, a substrate 10, and a polarized light selective-reflection layer 11 formed on the substrate 10.

In the present invention, since the polarized light selective-reflection layer diffuse-reflects the right-handed circularly polarized light or left-handed circularly polarized light selectively, for example, when the polarized light selective-reflection layer, which diffuse-reflects the right-handed circularly polarized light, is used, the left-handed circularly polarized light is not reflected by the circularly polarized light separation function, and influence of the external light can be reduced. Further when used in combination with the external light screen mentioned above, reflection of the external light on projection screen can be theoretically set to zero.

(1) Polarized Light Selective-reflection Layer

The polarized light selective-reflection layer used in the present invention is described. The polarized light selective-reflection layer used in the present invention diffuse-reflects the right-handed circularly polarized light or left-handed circularly polarized light.

In the present invention, by providing such polarized light selective-reflection layer, the right-handed circularly polarized light or left-handed circularly polarized light projected from the projector is diffuse-reflected, and a projection screen, which serves the purpose of the present invention, can be obtained.

In the polarized light selective-reflection layer, non-polarized light entering along the spiral axis is separated into two polarized lights (right-handed circularly polarized light and left-handed circularly polarized light), and one is transmitted and the other is reflected. This phenomenon is known as circularly dichroism. For example, when a spiral winding direction in spiral structure of liquid crystal molecules is properly selected, circularly polarized light element, having the same optical rotatory direction as this spiral winding direction, is selectively reflected.

In this case, maximum optical rotatory scatter occurs at wavelength $\lambda o$ in the following formula (1):

$$\lambda o = nav \cdot p \quad (1)$$

wherein p is spiral pitch length in spiral structure of liquid crystal molecules (length per pitch of molecular spiral of liquid crystal molecules), and nav is average refractive index in an orthogonal plane to the spiral axis.

At this time, wavelength band width $\Delta\lambda$ of reflected light is expressed in the following formula (2), wherein $\Delta n$ is birefringence value:

$$\Delta\lambda = \Delta n \cdot p \quad (2)$$

That is, as shown in FIG. 2 for example, the non-polarized light entering from the observer side of the projection screen (right-handed circularly polarized light 12R and left-handed circularly polarized light 12L within the selective-reflected wavelength region, right-handed circularly polarized light 13R and left-handed circularly polarized light 13L outside of the selective-reflected wavelength region) is separated according to the above-described polarized light separating property, so that one circularly polarized light element (for example, right-handed circularly polarized light 12R within the selective-reflected wavelength region), which belongs to the range (selective-reflected wavelength region) of the wavelength band width $\Delta\lambda$ that is centered on selective-reflection central wavelength $\lambda o$, is reflected as reflected light 14, and other lights (for example, left-handed circularly polarized light 12L within the selective-reflected wavelength region, right-handed circularly polarized light 13R and left-handed circularly polarized light 13L outside of the selective-reflected wavelength region) are transmitted.

Such polarized light selective-reflection layer is not particularly limited as long as the above-described right-handed circularly polarized light or left-handed circularly polarized light can be diffuse-reflected. Specifically, the following cases, etc. can be listed: a case of comprising a polarized light reflection layer for reflecting a specific circularly polarized light, and a diffusion element for diffusing the light reflected by the polarized light reflection layer; or a case wherein the polarized light selective-reflection layer itself has diffusing properly. The polarized light selective-reflection layer used in the present invention is specifically described below by dividing into two cases.

(i) A Case of Comprising a Polarized Light Reflection Layer for Reflecting a Specific Circularly Polarized Light, and a Diffusion Element for Diffusing the Light Reflected by the Polarized Light Reflection Layer The polarized light selective-reflection layer in this case is explained by dividing into polarized light reflection layer and diffusion element.

(a) Polarized Light Reflection Layer

The polarized light reflection layer used in the present invention reflects a specific circularly polarized light. Specific examples are: ones which reflect light by mirror reflection; and ones having a cholesteric liquid crystal structure of planar alignment state. By using such polarized light reflection layer, polarized light separating property can be obtained. Therefore, only the specific circularly polarized light, out of the light projected by the projector, can be reflected. Further, by the diffusion element described below, the light reflected by the polarized light reflection layer can be diffused, so that it can be used in a bright environment, and a projection screen high in brightness and excellent in visibility can be obtained.

(b) Diffusion Element

Next the diffusion element is explained. The diffusion element in the present invention diffuses the light reflected by the polarized light reflection layer. Such diffusion element is provided on the observer side of the above-described polarized light reflection layer for diffusing the light reflected by the polarized light reflection layer and emitting to the observer side of the projection screen.

Specifically, the diffusion element can be composed of bulk diffusion member, surface diffusion member, hologram diffusion layer, or an arbitrary combination of these diffusion layers. Specifically, the bulk diffusion member includes particles disposed in a transparent medium. The surface diffusion member includes structural plane, fine structural plane, roughened plane, etc. Diffusion achieved by the diffusion member may be either random or regular, or it may be partly regular.

(ii) A Case Wherein the Polarized Light Selective-reflection Layer Itself has Diffusing Properly In this case, the polarized light selective-reflection layer is not particularly as long as the layer itself has diffusing properly. Specifically, ones having a cholesteric liquid crystal structure, wherein the cholesteric liquid crystal structure is formed structurally uneven so that the projected light is separated in polarization and diffused, can be used. Such polarized light selective-reflection layer is explained below.

Since such polarized light selective-reflection layer has a cholesteric liquid crystal structure, the physical molecular arrangement of liquid crystal molecules is a spiral structure in which directors of liquid crystal molecules rotate continuously in the layer-thickness direction. And on the basis of such physical molecular arrangement of the liquid crystal molecules, the layer has polarized light separating property of separating the light into, for example, the circularly polarized light in one direction and circularly polarized light in reverse direction thereof. That is, in such polarized light selective-reflection layer, non-polarized light entering along the spiral axis is separated into two polarized lights (right-handed circularly polarized light and left-handed circularly polarized light), and one is transmitted and the other is reflected. This phenomenon is known as circular dichroism. When spiral winding direction in the spiral structure of the liquid crystal molecules is properly selected, the circularly polarized light element having the same optical rotatory direction as this spiral winding direction is selectively reflected.

Therefore, when the polarized light selective-reflection layer having cholesteric liquid crystal structure is used, by making the polarized light selective-reflection layer a layer, which reflects the specific wavelength of the same polarized light as the light emitted from the projector, the projected light can be reflected efficiently, and a projection screen of high brightness can be obtained. By transmitting external light or the like through the external light screen mentioned above, a circularly polarized light in reverse direction of circularly polarized light diffused and reflected by the polarized light selective reflection layer is obtained. Therefore, reflection of external light on projection screen can be theoretically set to zero to obtain display of sharp contrast. Moreover, P wave components of light from outer field can be taken into the projection system, and a bright state can be maintained.

The polarized light selective-reflection layer having such cholesteric liquid crystal structure preferably has the cholesteric liquid crystal structure formed structurally uneven so that the projected light may be separated in polarization and diffused.

Figure 3:
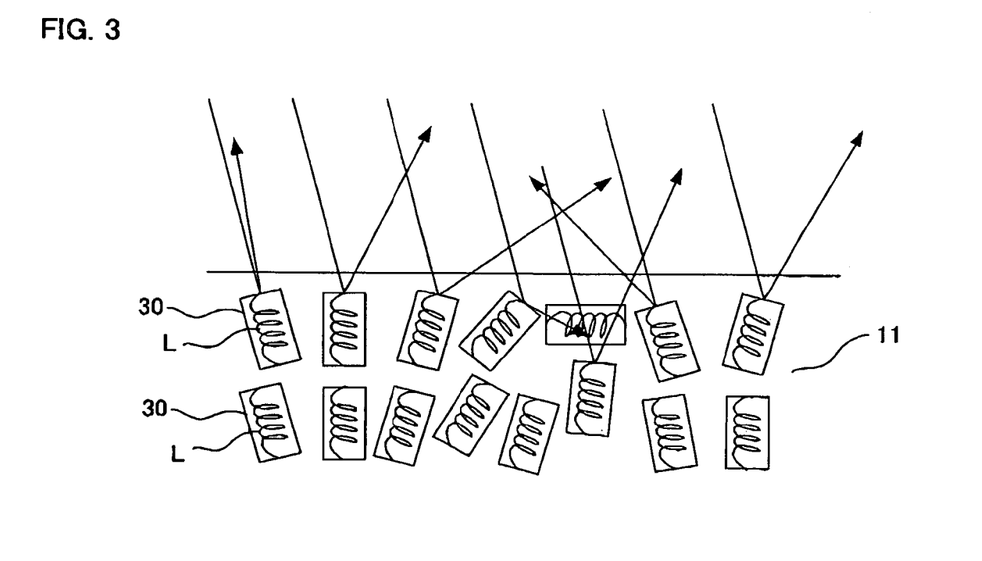
FIG. 3 is an illustration explaining structural unevenness of the cholesteric liquid crystal structure of the polarized light selective-reflection layer of the present invention.

As used herein, to form structural uneven cholesteric liquid crystal structure means that direction of alignment of each liquid crystal phase is not uniform in one direction, but is disturbed, when the polarized light selective-reflection layer is aligned. Specifically, the following situations, etc. can be listed: as shown in FIG. 3, a situation in which the direction of spiral axis L of spiral structural region 30 included in cholesteric liquid crystal structure of polarized light selective-reflection layer 11 is scattered; although not shown in the figure, a situation in which at least a part of the nematic layer plane (a plane in which the directors of the liquid crystal molecules are same in XY direction) is not parallel to the plane of polarized light selective-reflection layer (a situation in which, when a sectional TEM photograph of stain-treated cholesteric liquid crystal structural membrane is taken, one continuous curve of a layer appearing in contrast pattern is not parallel to the substrate surface); or a situation in which fine particles of cholesteric liquid crystal are dispersed as pigment. In any case, since the cholesteric liquid crystal structure is formed structurally uneven so that the projected light is separated in polarization and diffused, the image light projected from the projector is diffuse-reflected, not mirror-reflected, the image can be recognized easily. Since the polarized light selective-reflection layer at this time diffuses the selectively reflected light by its structural unevenness, a specific circularly polarized light can be diffusingly reflected, while other light can be transmitted without being diffused. Accordingly, there is no problem of depolarization in the image light or the ambient light passing through the polarized light selective-reflection layer, and the visibility of the image is improved while maintaining the polarized light separating function of the polarized light selective-reflection layer.

For example, method of forming the cholesteric liquid crystal structure structurally uneven is not particularly limited. For example, the following methods, etc. can be listed: a method in which the below-described substrate having no alignment in a specific direction is used; a method in which an amount of a photopolymerization initiator or a leveling agent used generally in formation of the polarized light selective-reflection layer is adjusted; a method in which non-liquid crystalline polymerizable compound is added in the polarized light selective-reflection layer; and a method in which liquid crystalline fine particles are contained. These methods may be arbitrarily selected, or these methods may be combined properly.

In the polarized light selective-reflection layer having a cholesteric liquid crystal structure, wherein this cholesteric liquid crystal structure is formed structurally uneven, a wavelength region, of which the reflecting strength thereof is one half or more of the maximum reflecting strength of the polarized light selective-reflection layer, is preferably only a part of visible light region (for example, wavelength region of 400 nm to 700 nm). As a result, light of specific wavelength in visible light region can be selectively reflected. As mentioned above, since the cholesteric liquid crystal reflects only the light of specific wavelength strongly, light in wavelength other than this specific wavelength is almost entirely absorbed into the substrate and the like. The wavelength region, which is reflected by the cholesteric liquid crystal for constituting the polarized light selective-reflection layer, is determined by the length of spiral pitch of the cholesteric liquid crystal.

The polarized light selective-reflection layer may be composed of one type of spiral pitch length, as long as the light of the wavelength irradiated, from the light source of projector, etc. can be reflected. However, for example, when the wavelength region of red (R) and green (G) is included in the wavelength band width of selective-reflection wavelength region of one spiral pitch length, it is preferred to have spiral pitch length of these wavelengths and spiral pitch length of blue (B), and particularly, it is preferred to have spiral pitch lengths of wavelengths of each red (R), blue (B) and green (G). This is because the light emitted from the projector is composed of red (R), blue (B) and green (G), and color display is realized by these three primary colors.

In the present invention, although it depends on the types of the projector, the specific wavelength to be selectively reflected is preferably the wavelength of 430 nm to 460 nm of blue (B), 540 nm to 570 nm of green (G), and 580 nm to 620 nm of red (R). As a result, color display is possible even if there is a difference in wavelength due to design of the apparatus or types of the light source, and a projection screen capable of expressing while color favorably can be realized.

The polarized light selective-reflection layer having such plural spiral pitch lengths can be composed by laminating layers having the cholesteric liquid crystal structure having each spiral pitch length.

The polarized light selective-reflection layer having cholesteric liquid crystal structure, wherein the cholesteric liquid crystal structure is formed structurally uneven (each layer, when the polarized light selective-reflection layer is composed of plural layers), preferably has a film thickness which reflects specified polarized light by 100%. Reflectivity of the polarized light selective-reflection layer for the polarized light depends on the film thickness of the polarized light selective-reflection layer. Therefore, when the reflectivity for the specific circularly polarized light (for example, right-handed circularly polarized light) selectively reflected is less than 100%, the image light cannot be reflected efficiently. To achieve 100% of reflectivity, usually, 4 pitches to 8 pitches are preferred. Specifically, it is usually 1 μm to 10 μm, although it depends on the types of material of polarized light selective-reflection layer or wavelength of circularly polarized light. When the thickness is thinner than the above-described thickness, the reflectivity is lowered, and it is difficult to reproduce the image projected on the projection screen at high brightness. On the other hand, when the thickness is thicker than the above-described thickness, it is difficult to control the cholesteric liquid crystal structure, or unevenness may occur.

In the case in which the polarized light selective-reflection layer has the cholesteric liquid crystal structure, wherein the cholesteric liquid crystal structure is formed structural unevenly so that the projected light is separated in polarization and diffused, the material for such polarized light selective-reflection layer includes chiral nematic liquid crystal and cholesteric liquid crystal, and a material having cholesteric regularity may be used without limitation. Particularly, a polymerizable liquid crystal material having polymerizable functional groups on both ends of molecule is preferable. As a result, after curing, an optically stable projection screen can be obtained. If the polymerizable liquid crystal material has nematic regularity or smectic regularity, a polymerizable chiral agent may be used. Materials used in polarized light selective-reflection layer and forming method of polarized light selective-reflection layer in the present invention are described below.

(a) Polymerizable Liquid Crystal Material

An example of such polymerizable liquid crystal material having polymerizable functional group is, for example, a compound (I) shown in the following general formula (1). As the compound (I), mixture of two kinds of compounds included in the general formula (1) can be used. Further, the polymerizable liquid crystal material may be composed of the above-described compound (I) and the compound (II) shown in the following general formulas (2) to (12).

As the compound (I), mixture of two kinds of compounds included in the general formula (1) can be used.

-continued

(9)

(10)

(11)

(12)

wherein x is an integer from 2 to S.

In the general formula (1) showing compound (I), $R^1$ and $R^2$ each shows a hydrogen or a methyl group, but both $R^1$ and $R^2$ are preferably hydrogen because of the width of temperature range showing liquid crystal phase. X can be any one of hydrogen, chlorine, bromine, iodine, or alkyl group, methoxy group, cyano group, or nitro group with 1 to 4 carbon atoms. However, chlorine or methyl group is preferable. Chain lengths (a) and (b) of alkylene groups, which are spacers between the (meth) acryloyloxy group and the aromatic ring on both ends of molecular chain of compound (I), can be individually arbitrary integers in a range of 2 to 12, preferably in a range of 4 to 10, more preferably in a range of 6 to 9. Compound of the general formula (1), in which a=b=0, lacks in stability, is likely to be hydrolyzed, and the compound itself is high in crystallinity. Compound of the general formula (1), in which both (a) and (b) are 13 or more, is low in isotropic transition temperature (TI). For this reason, these compounds are not preferable because the temperature range showing liquid crystal property of these compounds is narrow.

In the above example, polymerizable liquid crystal monomer is shown. However, polymerizable liquid crystal oligomer, polymerizable liquid crystal polymer, etc. can be also used in the present invention. For such polymerizable liquid crystal oligomer or polymerizable liquid crystal polymer, known materials can be properly selected and used.

(b) Chiral Agent

In the present invention, chiral nematic liquid crystal having cholesteric regularity, prepared by adding chiral agent to nematic liquid crystal, is preferably used.

The chiral agent used in the present invention means a low molecular compound having an optically active position whose molecular weight is 1500 or less. The chiral agent is mainly used for the purpose of inducing spiral pitch in positive uniaxial nematic regularity expressed by polymerizable liquid crystal material, for example, shown in compound (I) or compound (II) used as required. As long as this purpose is fulfilled, the types of the low molecular compound as chiral agent shown below is not particularly limited, if: it has solubility in a solution state or in a melting state with, for example, compound (I) or mixture of compound (I) and compound (II); and a desired spiral pitch can be induced without spoiling the crystallinity of polymerizable liquid crystal material having nematic regularity. However, a molecular having polymerizable functional groups on both ends is preferable from the viewpoint of obtaining optical element of excellent heat resistance. It is essential, for the chiral agent used to induce spiral pitch for the liquid crystal, to have some chirality, at least in the molecule. Therefore, the chiral agent usable in the present invention are, for example, a compound having one or two or more asymmetric carbon, a compound having asymmetrical point on hetero atom such as chiral amine or chiral sulfoxide, or a compound having axial asymmetry such as cumulene or binaphthol. Specifically, commercial product of chiral nematic liquid crystal, for example, S-811 manufactured by Merck can be listed.

However, depending on the properties of the selected chiral agent, the nematic regularity formed by the polymerizable liquid crystal material, such as compound (I) and mixture of compound (I) and compound (II), may be destroyed, the alignment property may be lowered, or if the compound is non-polymerizable, curing property of the liquid crystal composition may be lowered, or reliability of cured film may be deteriorated. Further, a heavy use of the chiral agent having optically active position leads to increase of cost of the composition. Therefore, when manufacturing circularly polarized light controlling optical element having cholesteric regularity of short pitch, as the chiral agent having an optically active position to be contained in the polymerizable liquid crystal material used in the present invention, it is preferable to select a chiral agent having large effect of inducing spiral pitch. Specifically, it is preferable to use a low molecular compound (III), having axial asymmetry in the molecule, as expressed in the following general formula (13), (14) or (15).

(13)

(14)

(15)

(i)

(ii)

(iii)

(iv)

(v)

(vi)

(vii)

(viii)

(ix)

(x)

(xi)

(xii)

(xiii)

(xiv)

(xv)

(xvi)

(xvii)

(xviii)

-continued

In the general formula (13) or (14) expressing chiral agent (III), $R^4$ shows hydrogen or methyl group. Y is any optional one of formulae (i) to (xxiv) shown above, and among the above, any one of formulae (i), (ii), (iii), (v) and (vii) is preferable. Chain lengths (d) and (e) of alkylene group are individually arbitrary integers in a range of 2 to 12, and preferably in a range of 4 to 10, and more preferably in a range of 6 to 9. Compound of the general formula (13) or (14), in which the value of (d) or (e) is 0 or 1, lacks instability, and is likely to be hyrdolyzed, and is high in crystallinity. On the other hand, the compounds, in which the value of (d) or (e) is 13 or more, is low in melting point (Tm). Hence, these compounds lower solubility with compound (I) or mixture of compound (I) and compound (II) showing crystallinity, and phase separation may occur depending on the concentration.

The optimum amount of the chiral agent blended in the polymerizable liquid crystal material of the present invention is determined in consideration of the spiral pitch inducing capability or cholesteric property of the finally obtained circularly polarized light controlling optical element. Specifically, although significantly variable depending on the polymerizable liquid crystal material to be used, it is selected in a rang of 0.01 to 60 parts by weight, preferably 0.1 to 40 parts by weight, more preferably 0.5 to 30 parts by weight, and most preferably 1 to 20 parts by weight, per 100 parts by weight of the total amount of the polymerizable liquid crystal material. If the blending amount is smaller than the above range, sufficient cholesteric property may not be given to the polymerizable liquid crystal material, or if exceeding the above range, alignment of molecules is inhibited, and may be adversely influenced when curing by active irradiation.

In the present invention, the chiral agent is not always required to be polymerizable. However, considering the thermal stability of the obtained polarized light selective-reflection layer, it is preferable to use the polymerizable chiral agent, which is polymerized with the above-described polymerizable liquid crystal material and is able to solidify the cholesteric regularity.

(c) Others

Besides the polymerizable liquid crystal material and chiral agent, the polarized light selective-reflection layer in this case may include other materials generally used in a polarized light selective-reflection layer, as required, such as photopolymerization initiator, intensifying agent, leveling agent, etc.

Photopolymerization initiator used in the present invention includes, for example, benzyl (or called bibenzoyl), benzoin isobutyl ether, benzoin isopropyl ether, benzophenone, benzoyl benzoate, methyl benzoylbenzoate, 4-benzoyl-4'-methyl diphenyl sulfide, benzyl methyl ketal, dimethyl amino methyl benzoate, 2-n-butoxy ethyl-4-dimethyl amino benzoate, isoamyl p-dimethyl aminobenzoate, 3,3'-dimethyl-4-methoxybenzophenone, methylobenzoyl formate, 2-methyl-1-(4-(methylthio) phenyl)-2-morpholinopropane-1-on, 2-benzyl-2-dimethylamino-1-(4-morpholinophenyl)-butane-1-on, 1-(4-dodecylphenyl)-2-hydroxy-2-methylpropane-1-on, 1-hydroxycyclohexyl phenyl ketone, 2-hydroxy-2-methyl-1-phenylpropane-1-on, 1-(4-isopropylphenyl)-2-hydroxy-2-methylpropane-1-on, 2-chlorothioxanthone, 2,4-diethyl thioxanthone, 2,4-diisopropyl thioxanthone, 2,4-dimethyl thioxanthone, isopropyl thioxanthone, 1-chloro-4-propoxy thioxanthone, etc. Aside from photopolymerization initiator, an intensifier may be added, in a range not to spoil the purpose of the present invention.

The content of photopolymerization initiator used in the present invention is in a range of 0.01 to 20 wt %, preferably 0.1 to 10 wt %, or more preferably 0.5 to 5 wt %.

In the present invention, as described above, the cholesteric liquid crystal structure of the polarized light selective-reflection layer may be formed structurally uneven, so that the projected light is separated in polarization and diffused, by adjusting the contents of these materials. For example, by increasing the content of photopolymerization initiator, molecular chain of the cholesteric liquid crystal is shortened, and alignment of the cholesteric liquid crystal surface may be disturbed. At this time, the photopolymerization initiator after reaction plays the role of impurity to disturb the alignment of the cholesteric liquid crystal in the cholesteric liquid crystal.

Moreover, by adding a non-liquid crystalline polymerizable compound not having liquid crystal alignment, the alignment of the cholesteric liquid crystal is disturbed, and the structure can be formed uneven. By adding liquid crystalline fine particles, alignment of the cholesteric liquid crystal may be disturbed. In the present invention, these methods may be properly combined, and the types and contents of these additives may be properly selected depending on the purpose.

(2) Substrate

The substrate used in the projection system used in the present invention is explained. The substrate used in the projection system of the present invention is not particularly limited as long as the polarized light selective-reflection layer can be formed. In the present invention, it is preferable to use a substrate which absorbs the light of wavelength in visible light region. Specifically, the substrate preferably absorbs light in a range of 400 nm to 700 nm. Accordingly, for example, when the polarized light selective-reflection layer is formed from the liquid crystalline composition having cholesteric regularity, reflection of the circularly polarized light, which is polarized to the reverse direction to the circularly polarized light of the cholesteric liquid crystal, can be prevented, and a projection screen high in brightness can be obtained.

Figure 4A:
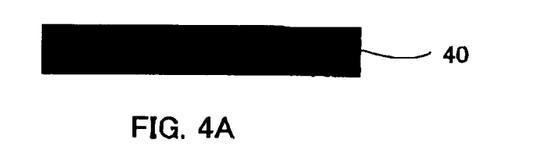
FIG. 4 is a schematic sectional view showing other examples of the substrate in the present invention.
Figure 4B:
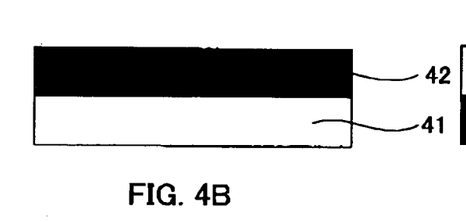
Figure 4C:
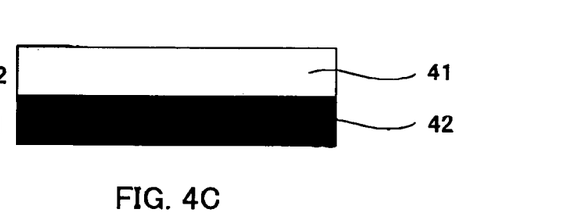

Substrate absorbing wavelength in visible light region includes, for example as shown in FIG. 4A, a plastic film 40 of which black pigment is kneaded therein. Moreover, as shown in FIG. 4B, a light absorbing layer 42 may be formed on a transparent plastic film 41. This light absorbing layer 42 may be formed on the polarized light selective-reflection layer-formed side, or as shown in FIG. 4C, the layer may be formed on the opposite side.

In the present invention, for example, when the polarized light selective-reflection layer has the cholesteric liquid crystal structure, wherein the cholesteric liquid crystal structure is formed structural uneven so that the projected light is separated in polarization and diffused, the substrate may be made of a material with few surface alignment, in order to form the cholesteric liquid crystal structurally uneven. Such material with few surface alignment includes, for example, non-drawn plastic film, or non-rubbed material. In order to obtain good regularity, the polarized light selective-reflection layer in such case is usually formed on a drawn or rubbed plastic film. However, in the present invention, by forming the polarized light selective-reflection layer on the substrate not drawing or rubbing processed, the liquid crystals on the substrate surface are not aligned regularly, and the alignment of the cholesteric liquid crystal structure can be disturbed so that the light projected from the projector may be separated in polarization and diffused.

Materials for substrate are not particularly limited. For example, thermoplastic polymers film, metal, paper, glass, etc. can be listed. Examples of plastic film are films made of: polycarbonate based polymer; polyester based polymer such as polyallylate and polyethylene terephthalate; polyimide based polymer; polysulfone based polymer; polyether sulfone based polymer; polystyrene based polymer; polyolefin based polymer such as polyethylene and polypropylenep; polyvinyl alcohol based polymer; cellulose acetate based polymer; polyvinyl chloride based polymer; polymethyl methacrylate based polymer; etc.

Film thickness of the substrate used in the present invention may be properly selected depending on the application and type of the projection screen. For example, when the projection screen is used in winding-up type, it is usually 15 μm to 300 μm, specifically 25 μm to 100 μm. When the projection screen is not used in the winding-up type, but used in panel type or the like, wherein flexibility is not required, the thickness of the substrate is not particularly limited.

The substrate used in the present invention may be surface-treated such as corona treatment and UV cleaning, in order to enhance adhesion with the polarized light selective-reflection layer.

Further, a plastic film provided with a tacky layer may be used. For example, PET film with tacky layer A4100 (trade name of Toyobo), tacky materials AC-X, AC-L, AC-W (trade names of Panak), etc. can be used.

(3) Projection Screen

Figure 5:
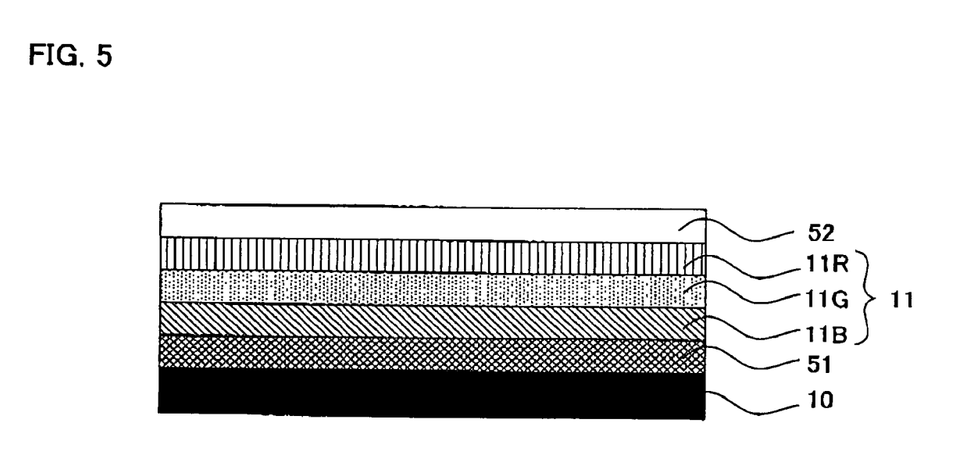
FIG. 5 is a schematic sectional view showing another example of the projection screen of the present invention.

The projection screen of the present invention is not particularly limited as long as the above-described polarized light selective-reflection layer is formed on the above-described substrate. For example, as shown in FIG. 5, it is enough if an adhesion improving layer 51 is formed on the substrate 10, and the polarized light selective-reflection layer 11 is formed on this adhesion improving layer 51. Further, an ultraviolet absorbing layer 52 may be formed on the polarized light selective-reflection layer 11. As mentioned above, the polarized light selective-reflection layer is not limited to one layer, but may comprise, as shown in FIG. 5 for example, red polarized light selective-reflection layer (11R), green polarized light selective-reflection layer (1G), blue polarized light selective-reflection layer (11B), etc., and further, layers of other colors may be also provided. Still more, as mentioned above, the ultraviolet absorbing layer 52 may have only ultraviolet absorbing function, but may have, in addition to ultraviolet absorbing function, also reflection preventive function, antiglare function, hard coating function, or other functions. Depending on the embodiment of the ultraviolet absorbing layer, for example, a reflection preventive layer, an antiglare layer, a hard coating layer, etc. may be formed separately.

In the present invention, it is preferred to form the adhesion improving layer. This adhesion improving layer is provided in order to enhance the adhesion between the substrate and polarized light selective-reflection layer. In the adhesion improving layer, type, material, etc. is not particularly limited. For example, acrylic based material or epoxy based material may be used.

In the present invention, illumination of the room in which the projection screen is used, is preferably the circularly polarized light opposite to the circularly polarized light reflected by the projection screen. As a result, even if the illuminating light incident on the projection screen, the projection screen does not reflect this light, but absorbs the light, so that high brightness can be obtained even in a bright environment. At this time, the illumination can be controlled by using reflecting type circular polarizer and the like, which uses absorbing type circular polarizer, circularly polarized light separation layer, linearly polarized light separation layer.

(4) Manufacturing Method of Projection Screen

Manufacturing method of projection screen in the present invention is explained. Manufacturing method of the projection screen in the present invention comprises, after adjusting the above-described substrate, a polarized light selective-reflection layer forming step of forming the polarized light selective-reflection layer by coating a composition, a mixture of materials for forming polarized light selective-reflection layer, on this substrate, thereby forming the polarized light selective reflection layer.

Manufacturing method of projection screen in the present invention is not particularly limited as long as the projection screen serving the purpose of the present invention can be obtained. This is to explain, as a specific example, a manufacturing method of projection screen having the cholesteric liquid crystal structure, wherein the cholesteric liquid crystal structure is formed structurally uneven so that the projected light is separated in polarization and diffused.

As a method of coating the composition on the substrate, the composition, a mixture of each material, may be coated as it is. However, from the viewpoint of adjustment of viscosity or alignment, it is preferred that the composition is dissolved in organic solvent. The solvent is not particularly limited as long as the substrate is not eroded. For examples, acetone, acetic acid-3-methoxy butyl, diglyme, cyclohexanone, tetrahydrofuran, toluene, xylene, chlorobenzene, methylene chloride, methyl ethyl keton, etc can be used. In this case, the composition is usually diluted to 5 wt % to 50 wt %, more preferably 10 wt % to 30 wt %.

The composition may be coated by any general method. For example, the coating can be carried out by roll coating method, gravure coating method, bar coating method, slide coating method, die coating method, slit coating method, immersion method, etc. When the substrate is a plastic film, the composition may be coated by roll-to-roll film coating method.

Successively, the composition is maintained at the specified temperature, at which the cholesteric liquid crystal structure is exhibited, and the composition is aligned. The cholesteric liquid crystal structure of the polarized light selective-reflection layer obtained finally is not in a planar alignment state, but is in disturbed alignment state with structural unevenness. However, also in this case, an alignment treatment is required. That is, an alignment treatment, in which the directors of the liquid crystal molecules of the cholesteric liquid crystal structure is aligned in a specific direction on the substrate, is not required. However, an alignment treatment, in which a plurality of spiral structure regions is formed in the cholesteric liquid crystal structure, is required.

The alignment treatment can be carried out by maintaining the composition at the specified temperature at which the cholesteric liquid crystal structure is exhibited. By this, the cholesteric liquid crystal exhibits a liquid crystal phase, and by the self-integration function of the liquid crystal molecule itself, spiral structure, in which the directors of the liquid crystal molecules are rotated continuously in thickness direction of the layer, is formed. The cholesteric liquid crystal structure expressed in such liquid crystal phase state can solidify the cholesteric liquid crystal by the following means.

When the solvent is contained in the liquid crystalline composition coated on the substrate, such alignment treatment is usually carried out together with a drying treatment for removing the solvent. To remove the solvent, drying temperature is preferably of 40 to 120° C., more preferably 60 to 100° C. The drying time (heating time) is not particularly specified as long as the cholesteric liquid crystal structure is expressed and the solvent is removed substantially, and for example, it is preferably 15 to 600 seconds, more preferably 30 to 180 seconds. When the alignment is found out to be insufficient after drying, heating time may be extended properly. When using a reduced pressure drying means in such drying treatment, another heating treatment is preferably carried out for the alignment treatment.

Next, the liquid crystal molecules in the polarized light selective-reflection layer aligned in the above-described alignment treatment are subjected to a solidification process, in which the cholesteric liquid crystal structure is solidified. Thereby, the cholesteric liquid crystal structure expressed in the liquid phase state is fixed.

As the methods used in the solidifying process, the following can be listed: (i) a method in which the solvent in the liquid crystalline composition is dried; (ii) a method in which the liquid crystal molecules in the liquid crystalline composition is polymerized by heating; (iii) a method in which the liquid crystal molecules in the liquid crystalline composition is polymerized by irradiating radioactive ray; and (iv) a method in which these methods are combined.

Among the above, the method of (i) is a method suited when using liquid crystal polymer as the liquid crystal material showing nematic regularity contained in the liquid crystalline composition, which is a material for the polarized light selective-reflection layer. In this method, the iquid crystal polymer is coated on the substrate in a state of being dissolved in a solvent such as organic solvent. In this case, only by removing the solvent by drying treatment, a solidified polarized light selective-reflection layer having cholesteric regularity is formed. As for the type of solvent and drying condition, those explained in the above-described coating treatment or alignment treatment can be used.

The method of (ii) is a method in which the polarized light selective-reflection layer is cured by polymerizing the liquid crystal molecules in the liquid crystalline composition by heating. In this method, since the bonding condition of the liquid crystal molecules is changed by heating (calcinating) temperature, if the temperature within the plane of polarized light selective-reflection layer is uneven at heating, unevenness occurs in the properties such as film hardness or optical propery. To maintain the distribution of film hardness within ±10%, it is preferable to maintain the distribution of heating temperature within ±5%, more preferably within ±2%.

Heating method of the polarized light selective-reflection layer formed on the substrate is not particularly specified as long as uniformity of heating temperature can be obtained. The layer may be held tightly on a hot plate, or the layer may be held in parallel to a hot plate, with a slight air layer provided therebetween. Moreover, the layer may be placed inside an apparatus for heating a specific space entirely, such as oven, or the layer may be passed through the apparatus. When using a film coater or the like, it is preferred to heat for a sufficient time by extending the heating zone.

As for the heating temperature, temperature of 100° C. or higher is usually required. In consideration of heat resistance of the substrate, the temperature up to 150° C. is preferable. However, it is also possible to heat over 150° C. when using a heat resistant film as substrate.

The method of (iii) is a method in which the polarized light selective-reflection layer is cured by photopolymerizing the liquid crystal molecules in the liquid crystalline composition by irradiating radioactive ray. In this method, proper radioactive ray, such as electron ray and ultraviolet ray, may be used depending on the conditions. Usually, ultraviolet ray is preferably used because of the simpleness of the apparatus, and its wavelength is 250 to 400 nm. When using ultraviolet ray, photopolymerization initiator is preferably added, as mentioned above, to the liquid crystalline composition. Incidentally, content of the photopolymerization initiator to be added to the liquid crystalline composition is in a range of 0.1 to 20 wt %, preferably 0.1 to 10 wt %, more preferably 0.5 to 5 wt %.

By carrying out this series of treatment (coating treatment, alignment treatment, and solidifying treatment), a projection screen having a single layer of the polarized light selective-reflection layer can be manufactured. By repeating this series of treatment, a projection screen having a plurality of layers of the polarized light selective-reflection layer can be manufactured. When the polarized light selective-reflection layer is further coated on the polarized light selective-reflection layer having light diffusion property, since the alignment state of the lower layer is continued, an alignment controlling layer is not particularly needed. However, other layers such as tacky layer may be formed.

The projection screen used in the present invention may be provided with an ultraviolet absorbing layer, as required. The ultraviolet absorbing layer may be formed, for example, by coating an ultraviolet absorbing layer forming coating solution on the projector side of the polarized light selective-reflection layer. Methods of coating include, specifically, roll coating method, gravure coating method, bar coating method, slide coating method, die coating method, slit coating method, immersing method, etc. When the substrate is a plastic film, it may be coated by roll-to-roll film coating method.

In the projection screen used in the present invention, by forming an adhesion improving layer, a reflection preventive layer, an anti-glare layer, a hard coat layer, etc. as required, the projection screen having thereof can be manufactured.

3. Projector

The projector used in the projection system of the present invention is explained. The projector used in the present invention is not particularly limited as long as it can display an image on the projection screen by contrast of light. For example, a cinematograph, which forms an image by disposing a film and the like in front of the light source, may be used. In the present invention, among the above, it is preferred to use projectors of spontaneous light type such as CRT system, liquid crystal system, or light bulb type such as DLP system. When circularly polarizing the emitted light, for example in the case of projector of liquid crystal system, by transmitting through a retardation plate which converts the emitted linearly polarized light into circularly polarized light, light can be converted into circularly polarized light with almost no loss in quantity of light. As the retardation plate used in this case, a λ/4 retardation plate is preferred. It is preferable to use ones of 137.5 nm, conforming to 550 nm, the highest visibility. Further, to be applicable to all wavelength of emitted RGB, a wide-band type λ/4 retardation plate is particularly preferable. As the wide-band type λ/4 retardation plate, the same ones as the retardation plate mentioned in "1. External light screen, (2) Retardation plate" above can be preferably used as well. The retardation plate may be either assembled in the projector, or externally attached at the exit.

In the projector of CRT system or DLP system, since the emitted light is not controlled in polarization, it is preferable to polarize the light linearly via the optical element, and to dispose the retardation plate. In this case, the quantity of light of the projector is reduced to half, but the contrast improving effect can be obtained.

B. External Light Screen

External light screen of the present invention is described. External light screen of the present invention is used in the projection system mentioned above. By using the external light screen, a desired circularly polarized light can be obtained. Since the transmission axis of the linearly polarizing plate is in vertical direction, anti-glare effect is obtained, and visibility from inside of projection system to outside is improved.

The external light screen of the present invention includes the linearly polarizing plate and retardation plate. These members are as same as those explained in "A. Projection system" above, and explanation is omitted herein.

The embodiment of the external light screen of the present invention is not particularly limited as long as the desired effects can be obtained in the projection system. For example, it may be a pasting type external light screen which is pasted directly to the external light entrance by providing an adhesive layer on the surface of the linearly polarizing plate positioned at the outer side of the external light screen. Instead of pasting directly on the external light entrance as described above, the external light screen may be used as a blind or partition near the external light entrance. The pasting type external light screen is preferably used, for example, in conference room and the like in which the projection system is permanently installed. The external light screen used as the blind or partition can be preferably used in, for example, household projection system and the like since desired effects can be obtained only when using the projection system by installing them on the window for taking in external light sufficiently usually. Since the linearly polarizing plate used in the external light screen of the present invention is usually manufactured by drawing treatment, the external light screen for long external light entrance can be preferentially manufactured industrially.

The present invention is not limited to the embodiments described above. The embodiments described above are merely illustrative, and any embodiments having substantially the same constitution and exhibiting the same function and effect as the technical ideas described in claims of the present invention is included in the technical scope of the present invention.

What is claimed is:

1. A projection system comprising: a projection screen, containing a substrate and a polarized light selective-reflection layer formed on the substrate and diffuse-reflects right-handed circularly polarized light or left-handed circularly polarized light, which displays an image by reflecting an image light irradiated from a projector;
   a projector for projecting an image light on the projection screen; and
   an external light screen installed at an entrance for an environmental light from outside, disposed in a sequence of a linearly polarizing plate and a retardation plate from an external side, and circularly polarizes a light in reverse direction to the circularly polarized light diffuse-reflected by the polarized light-selective reflection layer,
   wherein a transmission axis of the linearly polarizing plate is in vertical direction and an S wave contained in the environmental light from outside is not transmitted.

2. The projection system according to claim 1, wherein the polarized light selective-reflection layer has a cholesteric liquid crystal structure.

3. The projection system according to claim 1, wherein the external light screen is a wide-band type circularly polarizing plate which circularly polarizes a light in visible light region.

4. The projection system according to claim 2, wherein the external light screen is a wide-band type circularly polarizing plate which circularly polarizes a light in visible light region.

5. An external light screen used in the projection system according to claim 1.

6. An external light screen used in the projection system according to claim 2.

7. An external light screen used in the projection system according to claim 3.

8. An external light screen used in the projection system according to claim 4.

* * * * *